J. P. SHINN.
NEEDLE CONTROLLING MEANS FOR SOUND BOXES.
APPLICATION FILED JUNE 28, 1912.
1,048,219.
Patented Dec. 24, 1912.
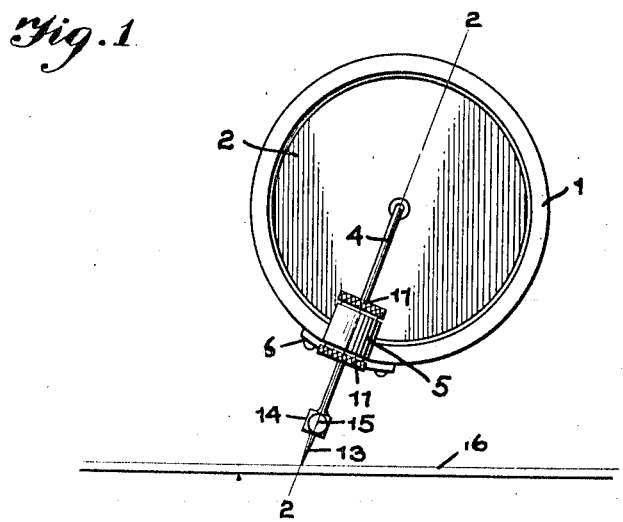
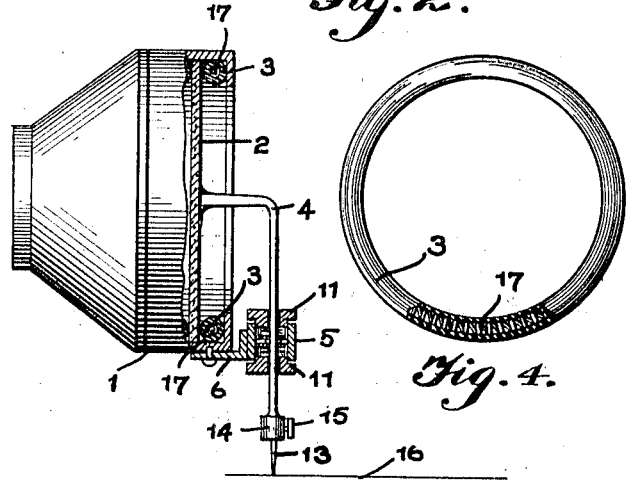
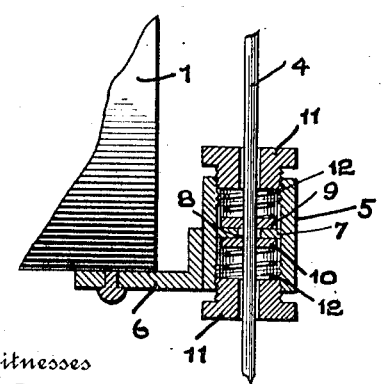
Witnesses
Inventor
James P. Shinn.
By Joshua R. H. Potts
Attorney

UNITED STATES PATENT OFFICE.

JAMES P. SHINN, OF CAMDEN, NEW JERSEY.

NEEDLE-CONTROLLING MEANS FOR SOUND-BOXES.

1,048,219.   Specification of Letters Patent.   Patented Dec. 24, 1912.

Application filed June 28, 1912. Serial No. 706,503.

*To all whom it may concern:*

Be it known that I, JAMES P. SHINN, a citizen of the United States, residing at Camden, in the county of Camden and State of New Jersey, have invented certain new and useful Improvements in Needle-Controlling Means for Sound-Boxes, of which the following is a specification.

My invention relates to improvements in needle controlling means for sound boxes, the object of the invention being to provide a phonographic sound box with improved means for controlling the vibration of the needle, which means is always under the control of the operator, so that the needle may be allowed just the proper amount of vibration to insure the best possible results.

A further object is to provide an improved diaphragm having a needle arm fixed thereto and projected through a cylinder in which mechanism is provided for elastically controlling the vibration of the needle arm.

With these and other objects in view, the invention consists in certain novel features of construction, and combinations and arrangements of parts, as will be more fully hereinafter described and pointed out in the claims.

In the accompanying drawings: Figure 1 is an end view of the sound box illustrating my improvements. Fig. 2 is a view partly in section on the line 2—2 of Fig. 1. Fig. 3 is a fragmentary view in section on an enlarged scale illustrating the needle arm controlling mechanism, and Fig. 4 is a view in elevation partly in section showing an improved form of diaphragm holding gasket.

1 represents a sound box in one end of which a diaphragm 2 is located and secured against a gasket 3 preferably having a coiled wire core 17, and a needle arm 4 is fixed to the center of the diaphragm. This needle arm is bent at right angles as shown and projects through a cylinder 5 fixed to the sound box by means of a bracket 6. In the center of the cylinder 5, a disk 7 is located, and this disk fits snugly in the cylinder and has a central opening 8 appreciably larger than the diameter of the needle arm which projects therethrough. On opposite sides of the disk 7, disks 9 and 10 respectively are located. These disks 9 and 10 have central openings of approximately the same diameter as the needle bar through which the latter projects, and they are of a diameter appreciably less than the internal diameter of the cylinder, so that they have a certain amount of lateral movement in the cylinder.

The opposite ends of the cylinder 5 are internally screw-threaded to receive plugs 11, and between the plugs 11 and the disks 9 and 10, coiled springs 12 are located which exert pressure on the disks 9 and 10. A needle 13 is secured in a sleeve 14 on the end of the needle arm by means of a thumb screw 15, and when this needle passes over the record illustrated at 16, it will vibrate and cause the diaphragm to vibrate as is customary. To control this vibrating movement of the needle, my improved arrangement of disks, springs, and plugs are provided in the cylinder 5, and it will be seen by adjusting these plugs the movement of the disks 9 and 10 on the faces of disk 7 will be regulated. In other words, the friction of these disks one upon the other will be controlled by the position of the plugs 11, and this vibration permitted the needle may be varied in accordance with the record.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a sound box, a diaphragm therein, and a needle arm connected to the diaphragm, of a cylinder secured to the sound box and through which said needle arm projects, a disk fitting the cylinder and having an opening therein larger than the needle arm through which the latter projects, disks on opposite sides of the first-mentioned disk having openings therein fitting the arm, said last-mentioned disks being smaller than the internal diameter of the cylinder, and means exerting pressure on said disks, substantially as described.

2. The combination with a sound box, a diaphragm therein, and a needle arm connected to the diaphragm, of a cylinder secured to the sound box and through which said needle arm projects, a disk fitting the cylinder and having an opening therein larger than the needle arm through which the latter projects, disks on opposite sides of the first-mentioned disk having openings therein fitting the arm, said last-mentioned disks being smaller than the internal diameter of the cylinder, said cylinder being internally screw-threaded in its ends, plugs in said ends, and coiled springs between the plugs and the disks, substantially as described.

In testimony whereof I have signed my name to this specification in the presence of two subscribing witnesses.

JAMES P. SHINN.

Witnesses:
 GEO. M. SMITH,
 E. S. WENTZ.